United States Patent

Bussian

Patent Number: 5,698,794
Date of Patent: Dec. 16, 1997

[54] IMPACT FLOWMETER FOR SOLIDS

[75] Inventor: Gerhard Bussian, Lake Wylie, S.C.

[73] Assignee: Thermo Sentron, Inc., Coon Rapids, Minn.

[21] Appl. No.: 574,767

[22] Filed: Dec. 19, 1995

[51] Int. Cl.$^6$ ............................................. G01F 1/30
[52] U.S. Cl. ............................................. 73/861.73
[58] Field of Search ........................ 73/861.73, 861.05, 73/861.04; 248/317, 581

[56] References Cited

U.S. PATENT DOCUMENTS

| | | |
|---|---|---|
| 3,613,449 | 10/1971 | Soejima et al. |
| 3,640,135 | 2/1972 | Tomiyasu et al. |
| 3,640,136 | 2/1972 | Nolte . |
| 3,742,762 | 7/1973 | Tomiyasu . |
| 4,069,709 | 1/1978 | Volk et al. |
| 4,128,001 | 12/1978 | Marks . |
| 4,157,661 | 6/1979 | Schindel . |
| 4,262,544 | 4/1981 | Herzl . |
| 4,354,622 | 10/1982 | Wood . |
| 4,380,175 | 4/1983 | Griffen . |
| 4,407,380 | 10/1983 | Elder . |
| 4,440,029 | 4/1984 | Tomiyasu et al. ........ 73/861.73 |
| 4,441,101 | 4/1984 | Robar . |
| 4,543,835 | 10/1985 | Volk, Jr. et al. . |
| 4,570,492 | 2/1986 | Walsh ........................ 73/861.05 |
| 4,768,387 | 9/1988 | Kemp et al. . |
| 4,955,270 | 9/1990 | Volk, Jr. . |
| 5,065,632 | 11/1991 | Reuter . |
| 5,132,917 | 7/1992 | Bass ........................... 73/861.04 |
| 5,335,554 | 8/1994 | Kempf et al. ............... 73/861.73 |
| 5,379,653 | 1/1995 | Saner . |

FOREIGN PATENT DOCUMENTS 2020038  11/1979  United Kingdom .

OTHER PUBLICATIONS

Milltronics Process Measurements, Hyflo E–40 Solids Flowmeter, Spec. sheet 800, Aug. 1984.
Milltronics, Hyflo Solids Flowmeters: Convenient, Dust-Tight Accurate, Continuous In–Line Weighing.
Milltronics, Solids Flowmeters, Mass Measurement of Free Flowing Bulk Solids, Nov. 1984.
Milltronics, Economical Continuous In–Line Weighing for even the Tightest Areas: Millflo Solids Flowmeter, Spec. sheet May 1989.
Non–Reference Conditions, Section 1.2.2 (date unkown).
Endress + Hauser, Technical Specifications —Solids Flow Measurement Graunumet Bulk Solids Flowmeter, (date unknown).

Primary Examiner—George M. Dombroske
Assistant Examiner—Jewel V. Artis
Attorney, Agent, or Firm—David George Johnson

[57] ABSTRACT

An impact flowmeter (10) for measuring a stream of free flowing bulk solids (60) having low mass flow rates. The flowmeter (10) includes a barrier (18) between the flowing stream of solids (60) and the sensor chamber (16). A primary sensing element (48) includes an impact plate (50) positioned to lie in flow chamber (14). A velocity sensor (39) is mounted to an inlet chute (32) for providing a velocity output signal (284) in response to the velocity of the solids in the stream of solids (60) as the stream of solids (60) passes the velocity sensor (39). The velocity sensor (39) includes a velocity circuit (278), a first capacitance sensor (41) and a second capacitance sensor (43) mounted to the side wall of the inlet chute (32) and arranged so that the solids in the stream of solids (60) pass by the first capacitance sensor (41) before passing by the second capacitance sensor (43). The velocity can then be computed as the predetermined distance divided by the travel time of the solids across the predetermined distance. A secondary sensing mechanism (92) includes a frame (94) having a horizontal plate (96) that is formed to include a circular opening (88). The plate (96) is formed to include the opening (88) to provide a space within the perimeter of the plate (96) for receiving an L-shaped arm (98) while also mimimizing the mass of the frame (94), thereby maximizing the sensitivity of the impact flowmeter (10).

52 Claims, 5 Drawing Sheets

5,698,794

IMPACT FLOWMETER FOR SOLIDS

BACKGROUND AND SUMMARY OF THE INVENTION

The present invention relates to a mass flowmeter, and particularly to an impact flowmeter for solids, the impact flowmeter measuring the mass flow rate of a stream of free flowing bulk solids. More particularly, the present invention relates to a mass flowmeter having an impact plate with an impact surface that is impinged by solids in a stream of free flowing bulk solids, the mass flow meter measuring the impact force of the solids against the impact surface and determining the mass flow rate of the stream therefrom.

An impact flowmeter can be positioned to lie in a flow conduit to determine the flow rate of solids through the conduit. Known impact flowmeters can include an impact plate located adjacent to a flowing stream of solids so that the solids passing through the flowmeter strike the impact plate. A sensor can be coupled to the impact plate to provide an output signal generally proportional to the force of the solids striking the impact plate. The mass flow rate of the solids is typically determined using the output signal of the sensor and an assumed velocity of the solids.

Impact flowmeters are known in the art. See, for example, U.S. Pat. No. 5,355,554 to Kempf et al.; U.S. Pat. No. 3,640,136 to Nolle; U.S. Pat. No. 4,069,709 to Volk et al.; U.S. Pat. No. 4,441,101 to Robar; U.S. Pat. No. 4,543,835 to Volk, Jr. et al.; U.S. Pat. No. 4,955,270 to Volk, Jr.; and U.S. Pat. No. 5,065,632 to Reuter, all of which disclose impact flowmeters for solids.

The present invention improves upon conventional impact flowmeters by providing increased sensitivity allowing for the measurement of a stream of free flowing bulk solids having low mass flow rates. The present invention also improves upon the accuracy generally provided by conventional impact flowmeters so that measurement errors are minimized even when the impact flowmeter of the present invention measures solids having low mass flow rates. The new impact flowmeter typically fits into existing equipment without requiring major modification to the existing systems. The flowmeter can be used with most mechanical conveying systems including belt conveyors, air slides, rotary valves, drag conveyors, and vibratory conveyors. Typical applications for the impact flowmeter of the present invention include flow rate control and metering hatching, loading and unloading, and mix ratio control. Typical industries which may be served by the present invention include mining, chemical, plastics, food, grain, and animal feed.

The impact flowmeter in accordance with the present invention includes a barrier between the flowing stream of solids and the measuring apparatus. The design of the impact flowmeter of the present invention minimizes unnecessary obstructions to the flow of the stream of solids and eliminates sites for dust accumulation and material build-up.

The design of the present invention additionally minimizes the use of elements that exhibit an initial resistance to deflection or movement due to inherent stiffness of the elements or inertia. Resistance to deflection or movement in conventional impact flowmeters inhibits the measurement of forces that are too small to overcome this initial resistance. The present invention, however, incorporates a cable suspension for supporting the moving parts. Cables of the cable suspension present very little resistance to deflection and the cable suspension presents very little resistance to movement in a measurement direction so that the impact flowmeter of the present invention can detect small forces.

According to the present invention, an impact flowmeter is provided for measuring the flow rate of solids flowing in a stream of free flowing bulk solids. The impact flowmeter comprises a housing having an inlet, an outlet, and an interior region therebetween. The housing is positioned so that the stream flows into the inlet and out through the outlet. The impact flowmeter also includes an impact sensing assembly received by the interior region of the housing.

The impact sensing assembly includes an impact plate engaging the solids. The impact plate is configured to move relative to the housing in a measurement direction in response to the impingement of the solids on the impact plate. In addition, the impact sensing assembly includes transducer means for providing a first output signal in response to the movement of the impact plate, the transducer means being fixed relative to the housing.

The impact sensing assembly also includes a moveable frame having a first end engaging the impact plate and a second end engaging the transducer means so that the frame communicates the movement of the impact plate in the measurement direction to the transducer means. A cable suspension including a plurality of cables is coupled to the housing and coupled to the frame to suspend the frame between the impact plate and the transducer means for movement of the frame in the measurement direction.

In preferred embodiments, the impact flowmeter according to the present invention can be provided with a velocity sensing mechanism for providing a velocity output signal that varies in response to the velocity of the stream of solids as the stream of solids flows between the inlet and the outlet. Preferably, the velocity sensing mechanism is positioned to lie in the housing and is configured to provide the velocity output in response to the velocity of the stream of solids at a location in the housing between the inlet and the impact plate.

Conventional impact flow meters operate using a "velocity assumption" that the velocity of the solids in the stream of solids is constant. The velocity is estimated based on the length and the angle of a flow channel formed in the housing between the inlet and the outlet. In contrast, the impact flowmeter according to the present invention includes the velocity sensing mechanism providing the velocity output signal so that the velocity of the solids in the stream of solids can be determined during the operation of the impact flowmeter. This "real time" velocity of the solids can be used to more accurately calculate the mass flow rate of the stream of solids, removing the error inherent in conventional impact flowmeters that operate using the velocity assumption.

The preferred velocity sensing mechanism includes first and second measuring capacitors that are mounted in the housing adjacent to the stream of solids and spaced apart by a predetermined amount. The travel time of the solids in the stream of solids between the first and second measuring capacitors is determined using the output from the sensors. The velocity can then be computed as the predetermined distance divided by the travel time of the solids across the predetermined distance.

The stream of solids flows through the housing under the force of gravity, flowing into the inlet, across the velocity sensing mechanism, falling against the impact plate, and moving out through the outlet. The impact plate is coupled to the transducer or primary sensor that provides the first output signal which varies in response to the extent of the impact forces against the impact plate.

The impact plate is coupled to the sensor through the frame suspended between the impact plate and the sensor.

The frame is suspended therebetween by the cable suspension including a plurality of tensioned cables that support the frame for movement in the measurement direction. Each cable is arranged to be at a nearly right angle to the frame relative to the measurement direction, thereby allowing for free movement of the frame in the measurement direction. Preferably, the cables cooperate to form a series of V-shaped connections to the frame that restrict movement of the frame in directions other than the measurement direction.

This "V configuration" causes the frame to return to a neutral or zero position in the absence of impingements on the impact plate. The zero position is typically reached when the tension on all of the cables is generally equivalent. Because cables have very little resistance to deflection, the frame will deflect in the measurement direction under the influence of even extremely small forces in the measurement direction, while the V configuration restricts movement of the frame in other directions.

Additionally, permanent magnets can be provided to further ensure that the frame returns to the zero position in the absence of impingements on the impact plate. A first magnet is fixed relative to the frame and a second magnet is fixed relative to the housing. The magnets are spaced apart so that the magnets are magnetically coupled, and are positioned on the frame and on the housing to maximize the attraction between the magnets when the frame is in the zero position. As a result, the magnets assist in pulling the frame to the zero position.

Although the output signal of the primary sensor is primarily in response to impact forces caused by the impingement of solids against the impact plate, the output signal of the primary sensor also includes undesired "noise" that is in response to several uncontrolled system variables such as, for example, misalignment of the housing, vibration, temperature changes, and the pressure differential between the inside and the outside of the housing. The noise masks a portion of the output signal of the primary sensor, reducing the accuracy and sensitivity of the indication provided by the impact flow meter.

Thus in preferred embodiments, the impact flowmeter is provided with a second sensor providing a second output signal in response primarily to the uncontrolled system variables. The second sensor is configured to provide the second output signal in response to the same uncontrolled system variables affecting the primary sensor so that the second output signal contains only noise included in the output signal of the primary sensor.

The second output signal, which is in response only to noise, can be reversed and superimposed on the first output signal to provide a third output signal. The reversed second output signal cancels much of the noise of the first output signal so that the third output signal more clearly indicates the impact forces created by the solids impinging upon the impact plate. Combining the first and second output signals to produce the third output signal compensates for uncontrolled variables that may affect the first output signal. For example, in various instances combining the first and second output signals to provide the third output signal may compensate for misalignment of the housing, vibration of the impact flowmeter, temperature changes of the impact flowmeter, and pressure variations between the inside of the housing and the outside of the housing. In addition, the velocity output signal from the velocity sensing mechanism can be combined with the third output signal to provide a flowmeter output signal that is a more sensitive and accurate indication of the actual mass flow rate of the stream of solids than is typically provided by conventional impact flowmeters.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
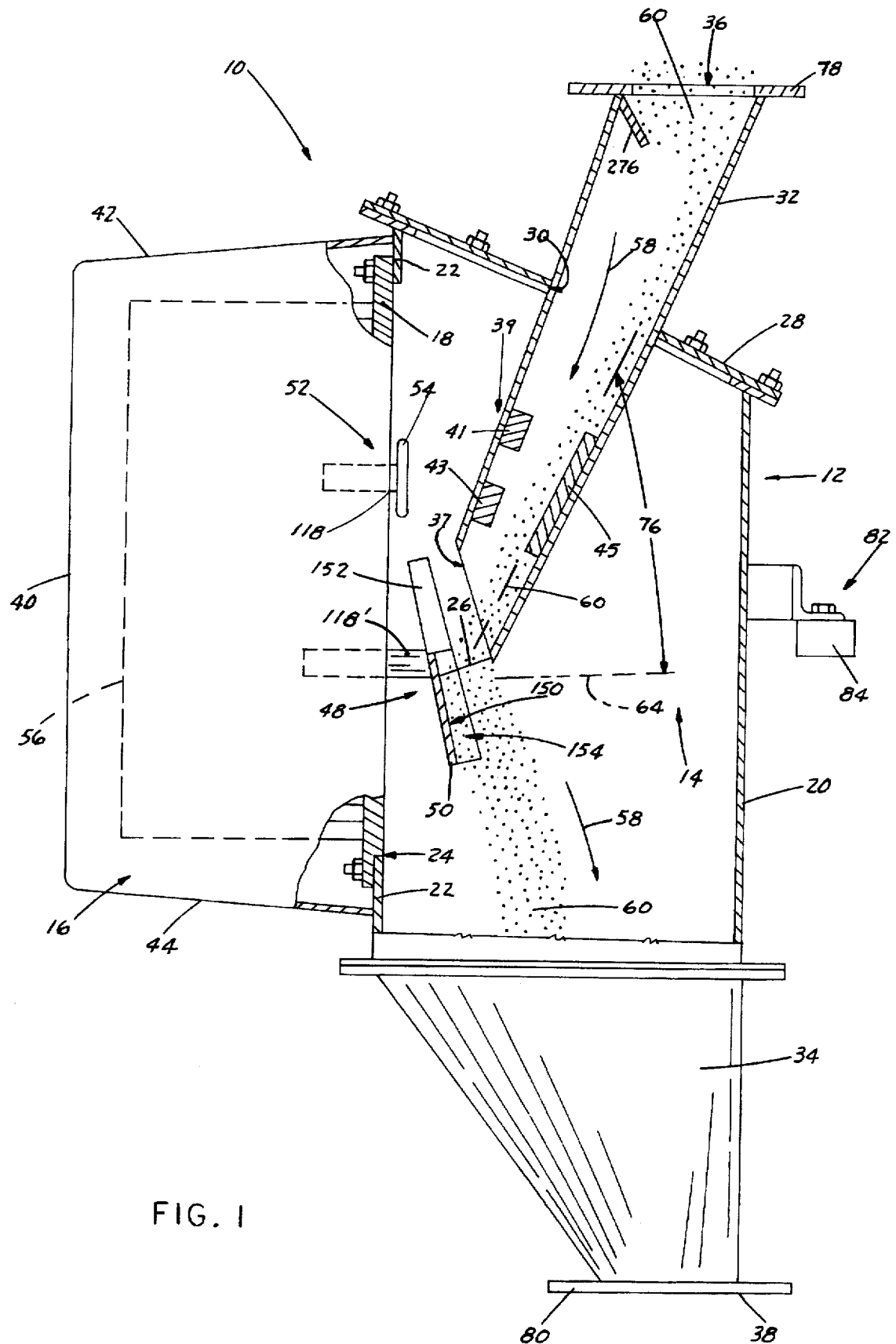
FIG. 1 is a side elevation view, with portions broken away, of the impact flowmeter of the present invention showing a stream of free flowing bulk solids entering a housing through an inlet, flowing through a chute past a velocity sensing mechanism and past a secondary sensing element that is positioned to lie above the stream and outside of the chute, impinging upon an impact plate, and flowing out of the housing through a discharge section, the impact plate and the secondary sensing element being coupled to a rearward sensing assembly (in phantom)

An impact flowmeter 10 according to the present invention includes a trapezoidal housing 12 formed to include a flow chamber 14, a sensor chamber 16, and a generally vertical base plate 18 separating flow chamber 14 and sensor chamber 16 as shown in FIG. 1. Flow chamber 14 is defined by a front wall 20, an intermediate wall 22 formed to include an opening 24 covered by base plate 18, and two side walls (not shown).

Flow chamber 14 is also defined by a slanted top wall 28 formed to include an opening 30 as shown in FIG. 1. An inlet chute 32 is received by opening 30 and extends downwardly and rearwardly through top wall 28 and into flow chamber 14. An outlet or discharge section 34 is connected to the bottoms of front and intermediate walls 20, 22 and side walls (not shown) of flow chamber 14. Inlet chute 32 includes an upper opening 36, a lower opening 37, and a side wall carrying a velocity sensor 39 having two spaced-apart capacitance sensors 41, 43 mounted on one side of inlet chute 32 and a counter electrode 45 mounted on inlet chute 32 opposite capacitance sensors 41, 43. Discharge section 34 includes a lower opening (not shown) adjacent to a lower end 38 of discharge section 34, and the lower opening of discharge section 34 is in fluid communication with upper opening 36 of inlet chute 32 through flow chamber 14.

Sensor chamber 16 is defined by intermediate wall 22 and base plate 18 as shown in FIG. 1. In addition, sensor chamber 16 is defined by rear wall 40, top wall 42, bottom wall 44, and side walls 46 shown in FIG. 4. A primary sensing element 48 extends from flow chamber 14 through base plate 18 and into sensor chamber 16 as shown in FIG. 1. Primary sensing element 48 includes an impact plate 50 positioned to lie in flow chamber 14. Impact plate 50 can be circular and mounted flush with baseplate 18 or it can be square or rectangular and can include a stem 118' so that impact plate 50 is positioned to lie in front of base plate 18 as shown in FIG. 1.

Additionally, impact plate 50 includes a forwardly-facing impact surface 150 that can be formed in a variety of shapes and orientations. For example, impact surface 150 can be generally planar and can be positioned to extend generally vertically, impact surface 150 can be generally planar and can be inclined as shown in FIG. 1, and impact plate 150 can be concave or snow shovel-shaped. Impact plate 50 can also be provided with side flanges 152 as shown in FIG. 1 so that impact surface 150 and side flanges 152 cooperate to define a channel 154. A flexible diaphragm 49 couples primary sensing element 48 to base plate 18 for movement in a measurement direction 64 with respect thereto, as shown best in FIG. 5.

Likewise, secondary sensing element 52 includes a sensing plate 54 in flow chamber 14 and secondary sensing element 52 extends through base plate 18 and into sensor chamber 16 as shown in FIG. 1. A flexible diaphragm 53 couples secondary sensing element 52 to base plate 18 for movement with respect thereto as shown best in FIG. 5. A sensing assembly 56 is supported by base plate 18 and is positioned to lie in sensor chamber 16 as shown in FIG. 1. Both of the primary and secondary sensing elements 48, 52 are coupled to sensing assembly 56.

A top flange 78 is attached to a top end of inlet chute 32. Flange 78 is designed to be coupled to an existing conduit (not shown) for a bulk material. A bottom flange 80 is attached to a bottom end of discharge section 34 and is also designed to be coupled to existing conduit. Flange 78 is substantially parallel to and in vertical alignment with flange 80 to facilitate mounting flowmeter 10 in existing process conduits. A mount 82 is provided for mounting housing to a stabilizing surface (not shown) and to support the weight of flowmeter 10. Mount 82 includes vibration isolators 84 to isolate flowmeter 10 from external sources of vibration. In addition, two other mounts (not shown) similar to mount 82 are provided so that the two other mounts cooperate with mount 82 to support the weight of flowmeter 10.

A stream of free flowing bulk solids generally denoted by reference numeral 60 as shown in FIG. 1 flows in the direction of arrows 58 from the conduit (not shown), into upper opening 36 of inlet chute 32, down through inlet chute 32, past velocity sensor 39 to impinge impact plate 50, out of housing 12 through discharge section 34, and into the conduit (not shown) beneath impact flowmeter 10 through the opening (not shown) formed in lower end 38 of discharge section 34. Sensing plate 54 is preferably positioned to lie above impact plate 50 and above lower opening 37 of inlet chute 32 so that solids from stream 60 do not impinge sensing plate 54.

In the preferred embodiment, inlet chute 32 is mounted so that stream 60 flows at a predetermined angle 76 of approximately 65 degrees (65°) relative to measurement direction 64 after entering impact flowmeter 10 as shown in FIG. 1. Additionally, inlet chute 32 is configured to direct stream 60 so that stream 60 strikes impact plate 50 from a predetermined distance 26. Inlet chute 32 is preferably tapered so that the size of lower opening 37 of inlet chute 32 is approximately 60–70% of the size of upper opening 36 of inlet chute 32.

Figure 5:
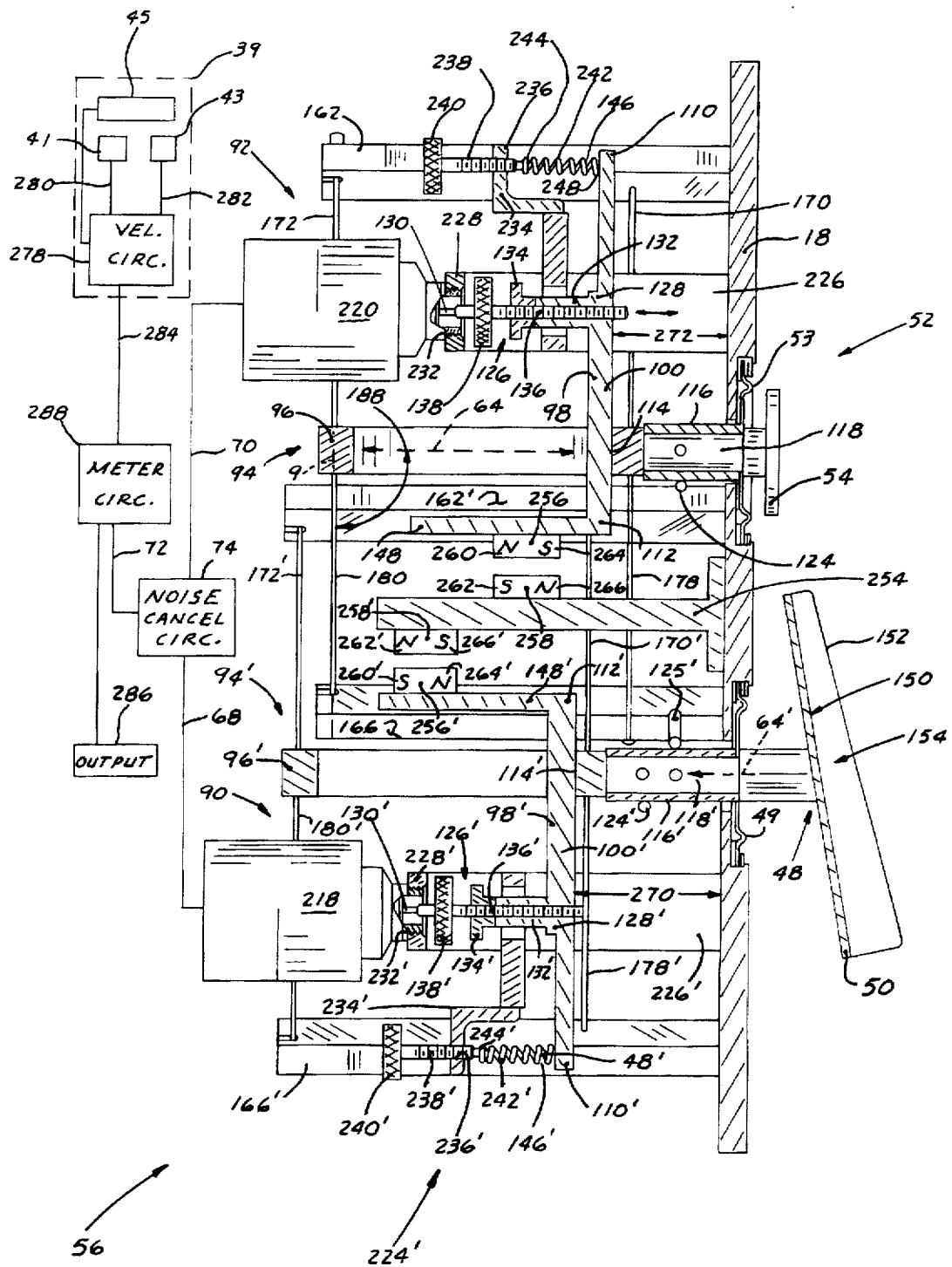
FIG. 5 is a sectional view taken along line 5—5 of FIG. 4 showing a frontward vertical base plate of the housing and the sensing assembly positioned to lie behind the base plate, the sensing assembly including the two frames, each frame having the horizontal plate and the L-shaped arm fixed to the plate, the horizontal plate of each frame being coupled to one of the impact plate and the secondary sensing element, the horizontally extending magnet-support post extending rearwardly from the base plate to bisect the impact flowmeter, and pre-tensioning springs coupled to each L-shaped arm to preload the sensors and to ensure that engagement is maintained between the L-shaped arms and the sensors.

The stream 60 is discharged from lower opening 37 of inlet chute 32 into flow chamber 14 of housing 12 and strikes impact plate 50. Impact plate 50 is deflected upon impact by stream 60 by an amount related to the velocity and the mass flow of stream 60. Impingement of stream 60 on impact plate 50 causes impact plate 50 to deflect and to move in measurement direction 64 as shown in FIGS. 1 and 5. Sensing assembly 56 senses the deflection of impact plate 50 and provides a first output signal 68 in response to the deflection of impact plate 50.

Primary sensing element 48 additionally senses "undesired inputs" such as movement of housing 12 and undesired movement of sensing assembly 56 that is not necessarily related to impingement of stream 60 on impact plate 50. The movement of primary sensing element 48 can also be affected by changes of uncontrolled variables such as, for example, misalignment of housing 12, vibration, temperature changes, and the pressure differential between the inside and the outside of housing 12. The sensing of the undesired movement of the housing and of changes of the uncontrolled system variables by primary sensing element 48 results in "noise" that masks the portion of output signal 68 due to the impingement of stream 60 on impact plate 50, thus interfering with the indication of the mass flow rate of stream 60.

Sensing plate 54 is generally the same mass as impact plate 50 so that secondary sensing element 52 senses the undesired inputs such as the undesired movement of housing 12 and the undesired movement of sensing assembly 56 as well as changes of uncontrolled system variables to generally the same extent that primary sensing element 48 senses such undesired inputs. As best shown in FIG. 5, sensing assembly 56 senses the deflections of sensing plate 54 and secondary sensing element 52 and provides a second output signal 70 in response to the deflections of sensing plate 54 and secondary sensing element 52. In other words, sensing assembly 56 provides second output signal 70 in response to the noise present in impact flowmeter 10.

A noise cancellation circuit 74 can be provided to reverse second output signal 70 and to superimposed the reversed second output signal 70 onto first output signal 68 to produce third output signal 72 in response to the first and second output signals 68, 70 as shown diagrammatically in FIG. 5. Noise cancellation circuits such as noise cancellation circuit 74 are well known to those skilled in the art.

Reversing and superimposing second output signal 70 onto first output signal 68 effectively cancels much of the noise in first output signal 70 so that third output signal 72 approximates an output signal that would be provided by primary sensing element 48 and sensing assembly 56 in the absence of the noise. Thus, second output signal 70 can be used to compensate for the undesired inputs that contribute to the noise such as, for example, misalignment of housing 12, undesired movement or vibration of housing 12, undesired movement or vibration of sensing assembly 56, temperature changes, and pressure variations between the inside of housing 12 and the outside of housing 12. As a result, stream 60 impinges upon impact plate 50 to deflect and move impact plate 50 by an amount that is related to the mass flow rate of stream 60, and sensing assembly 56 senses the deflection of impact plate 50 and provides third output signal 72 in response to the deflection of impact plate 50, third output signal 72 indicating the force of the impingements of the solids of stream 60 against impact plate 50.

Figure 2:
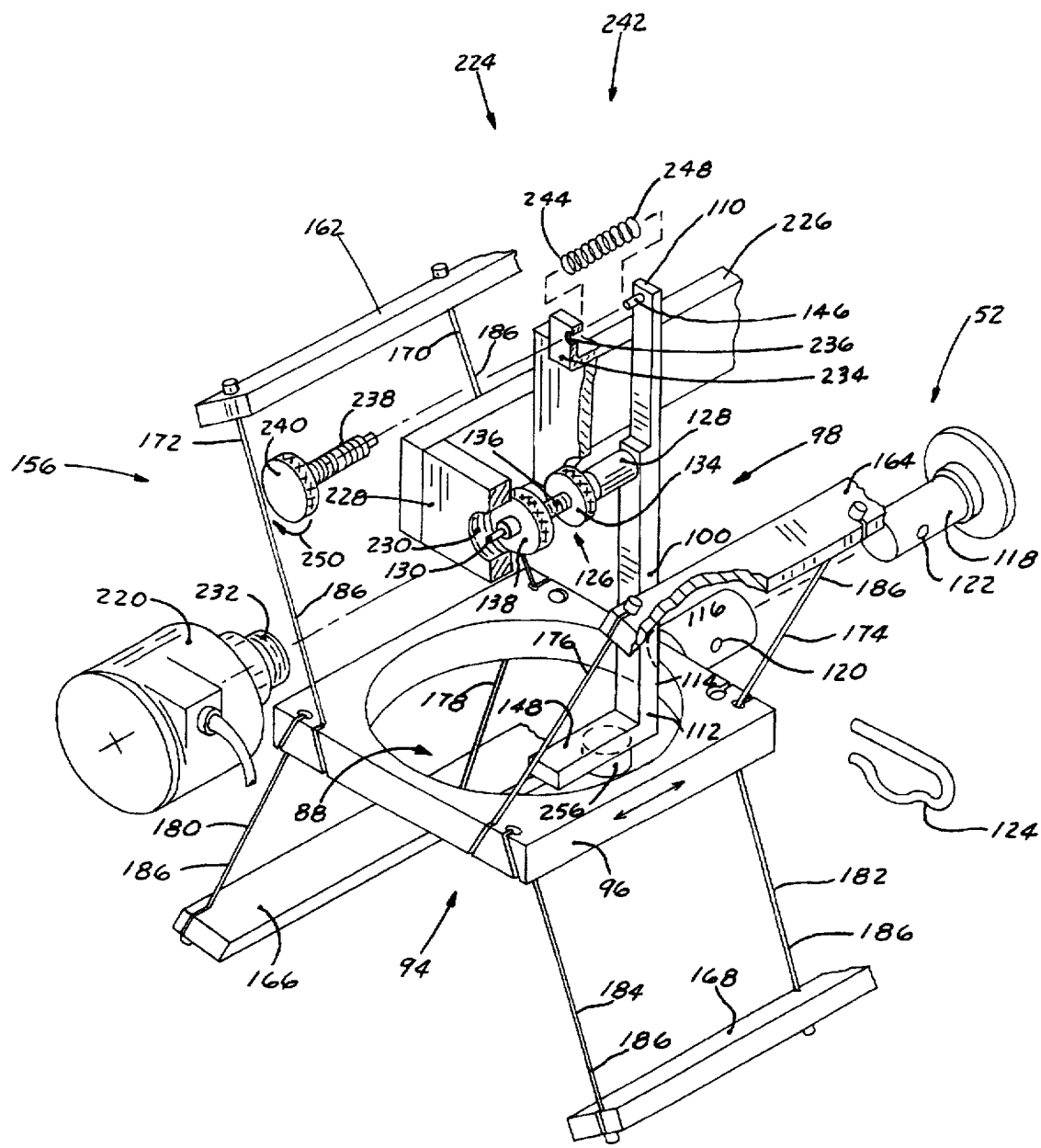
FIG. 2 is an exploded perspective view of a portion of the housing and a portion of the sensing assembly showing four posts extending rearwardly to surround the sensing assembly, a plurality of cables, and a frame including a horizontal rectangular plate having a circular opening, the plate being rigidly connected to the secondary sensing element, and an L-shaped arm fixed to the plate and having an elongated back portion engaging a sensor, the cables coupling the frame to the posts and suspending the frame between the secondary sensing element and the sensor.
Figure 4:
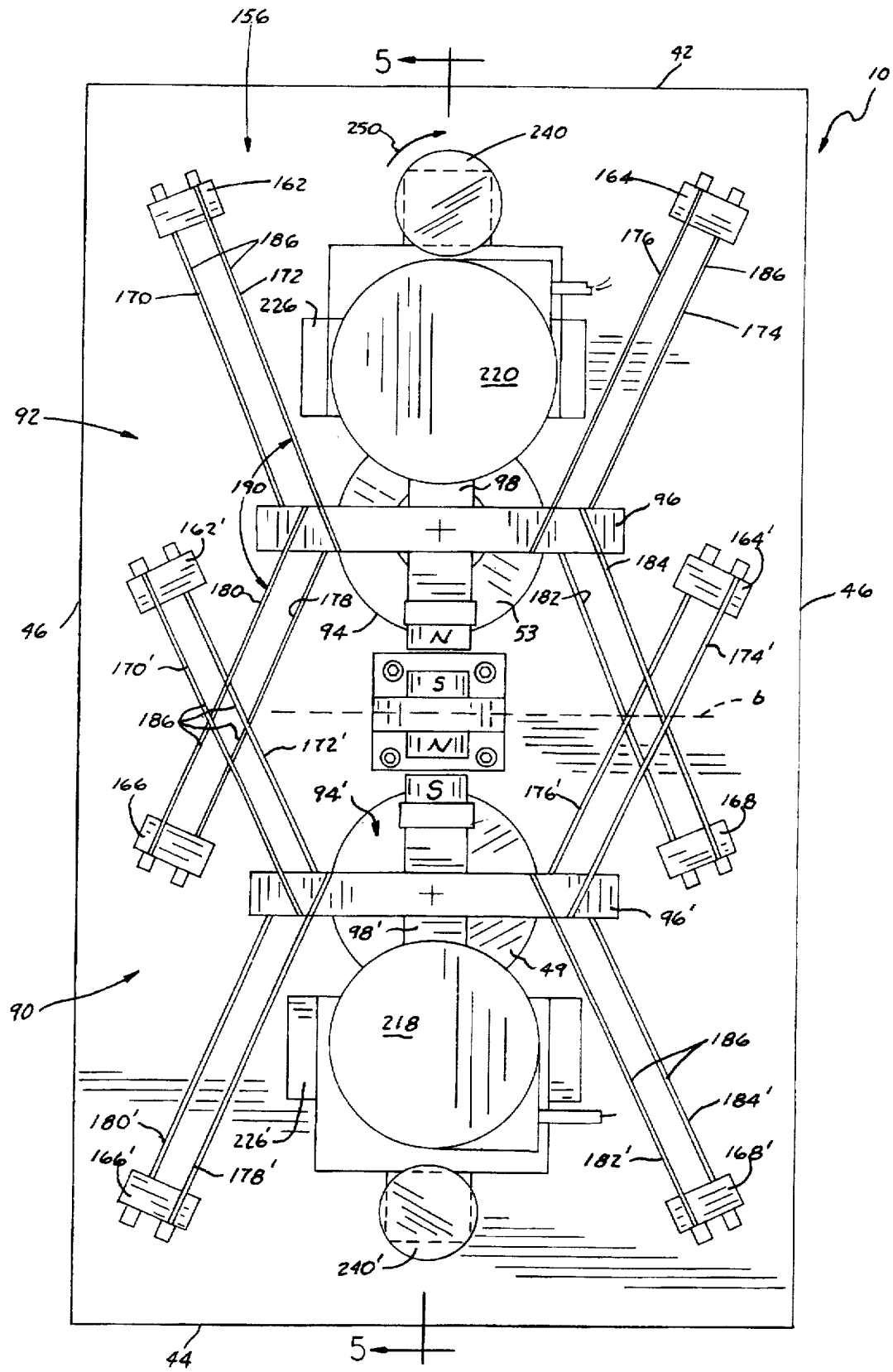
FIG. 4 is a rear elevation view of the impact flowmeter of FIG. 1 showing the sensing assembly including upper and lower round adjustment knobs, upper and lower sensors positioned to lie between the upper and lower knobs, upper and lower frames supported by upper and lower cable suspensions and including upper and lower vertical arms, two stationary permanent magnets fixed to a magnet-support post appended to the housing, and movable permanent magnets fixed to each of the upper and lower arms and spaced apart from the magnets on the magnet-support post, the magnets on the magnet-support post being magnetically coupled to the magnets on the arms.

Sensing assembly 56 includes two sensing mechanisms shown in FIGS. 4 and 5 including a primary sensing mechanism 90 and a secondary sensing mechanism 92 shown in FIG. 2. Primary and secondary sensing mechanisms 90, 92 are similar except that primary sensing mechanism 90 is coupled to impact plate 50 and secondary sensing mechanism 92 is coupled to secondary sensing element 52. The description below of secondary sensing mechanism 92, therefore, pertains also to primary sensing mechanism 90. Like reference numerals are applied to the structure of secondary mechanism 92 and to like structure of primary mechanism 90 in FIGS. 4 and 5 with the exception that reference numerals applied to the structure of primary mechanism 90 are distinguished with a prime (') indication.

Secondary sensing mechanism 92 includes a frame 94 having a horizontal plate 96 that is formed to include a circular opening 88 as shown in FIG. 2. Horizontal plate 96 is rigidly attached to secondary sensing element 52 and an L-shaped arm 98 is received by opening 88 and is rigidly attached to plate 96. Forming plate 96 to include opening 88 provides space within the perimeter of plate 96 for receiving L-shaped arm 98 while also minimizing the mass of frame 94, thereby maximizing the sensitivity of impact flowmeter 10.

L-shaped arm 98 includes a back portion 100 having an upper first end 110, a lower second end 112, and an attachment point 114 spaced-apart from each of the first and second ends 110, 112. Attachment point 114 is fixed to a socket 116 that receives stem 118 of secondary sensing element 52. Socket 116 and stem 118 are both formed to include openings 120, 122 that are collinear when stem 118 is received by socket 116. A cotter pin 124 is received by openings 120, 122 to rigidly couple secondary sensing element 52 and L-shaped arm 98. Use of cotter pin 124 to rigidly attach secondary sensing element 52 to L-shaped arm 98 allows for easy removal and replacement of secondary sensing element 52 and resilient diaphragm 53.

A rearwardly extending generally horizontal adjustable post 126 having a tip 130 is fixed to back portion 100 at a second attachment point 128 that is spaced-apart from first and second ends 110, 112, and from attachment point 114 as shown in FIG. 2. The length of post 126 between attachment point 128 and tip 130 is adjustable. Post 126 includes an outer sheath 132 as shown best in FIG. 5. A threaded nut 134 is fixed to sheath 132 and is configured to threadingly engage a threaded inner post 136. A knob 138 is appended to inner post 126 and rearwardly extending tip 130 of post 126 is appended to knob 138. Rotation of knob 138 in a counterclockwise first direction rotates inner post 136 and causes inner post 136 to extend from sheath 132, thereby lengthening post 126. Rotation of knob 138 in a clockwise second direction causes inner post 136 to withdraw into sheath 132, thereby shortening post 126.

L-shaped arm 98 additionally includes a pretensioning pin 146 appended to back portion 100 adjacent to first end 110 and a generally horizontal platform 148 appended to second end 112 of back portion 100 as shown in FIG. 2. L-shaped arm 98 including pin 146, platform 148, and post 126 cooperate with plate 96 and socket 116 to form rigid frame 94. Secondary sensing element 52 is rigidly attached to frame 94 as described above so that an essentially rigid member is provided between sensing plate 54 and tip 130. Likewise, primary sensing element 48 is rigidly attached to a frame 94' in a similar manner to that described above with respect to secondary sensing element 52 so that an essentially rigid member is provided between primary sensing element 48 and tip 130'.

Frame 94 is suspended within housing 12 to minimize friction and facilitate movement of frame 94 in measurement direction 64 while substantially restricting movement of frame 94 in directions other than measurement direction 64. In the preferred embodiment, this suspension is accomplished by a cable suspension 156 that couples frame 94 to housing 12 as shown in FIGS. 2, 4, and 5. Housing 12 is provided with posts that are appended to base plate 18 and that extend rearwardly therefrom. Cable suspension 156 couples frame 94 to two upper posts 162, 164 and two lower posts 166, 168, as shown best in FIG. 2.

Posts 162, 164, 166, 168 are preferably positioned to lie outwardly and away from horizontal plate 96 of frame 94 and cooperate to surround plate 96 as shown in FIGS. 2 and 4 to form a cage around frame 94. In the preferred embodiment, cable suspension 156 includes cables 186 including a pair of parallel cables 170, 172 interconnecting post 162 and frame 94, a pair of parallel cables 174, 176 interconnecting post 164 and frame 94, a pair of parallel cables 178, 180 interconnecting post 166 and frame 94, and a pair of parallel cables 182, 184 interconnecting post 168 and frame 94.

Each cable 186 is positioned to lie in a plane that is generally perpendicular to measurement direction 64 as shown in FIG. 5. Cable 180, for example, is positioned to lie in a plane indicated by line a (plane a extends perpendicular to the page in the illustration). Preferably, plane a is perpendicular to measurement direction 64, though satisfactory results have been achieved when plane a is at an angle 188 between 85 and 95 degrees (85° to 95°) relative to measurement direction 64. It is also preferred that all cables 186 are substantially parallel to plane a as shown in FIG. 5. Cables 186 provide little resistance to deflection in measurement direction 64 when positioned to lie generally perpendicular to measurement direction 64, thus allowing frame 94 to move in measurement direction 64 under the influence of very small forces.

Additionally, however, cables 186 cooperate to restrict movement of frame 94 in directions other than measurement direction 64. This is accomplished by arranging cables 186 in a "V configuration" as shown best in FIG. 4. For example, cables 172, 180 cooperate to define an angle 190 when viewed from a rear elevation view as shown in FIG. 4. Angle 190 is preferably between 130 and 160 degrees (130° to 160°).

It is also preferred that cables 170, 172, 182, 184 are substantially parallel and that cables 174, 176, 178, 180 are substantially parallel. Thus, cables 170, 172, 174, 176 cooperate to define a generally V-shaped cable structure and cables 178, 180, 182, 184 cooperate to define a generally upside-down V-shaped cable structure. When cables 186 are in this V configuration, movement of frame 94 in directions other than measurement direction 64 is restricted. When cables 186 are additionally substantially perpendicular to measurement direction 64, movement in measurement direction 64 is relatively free.

Figure 3:
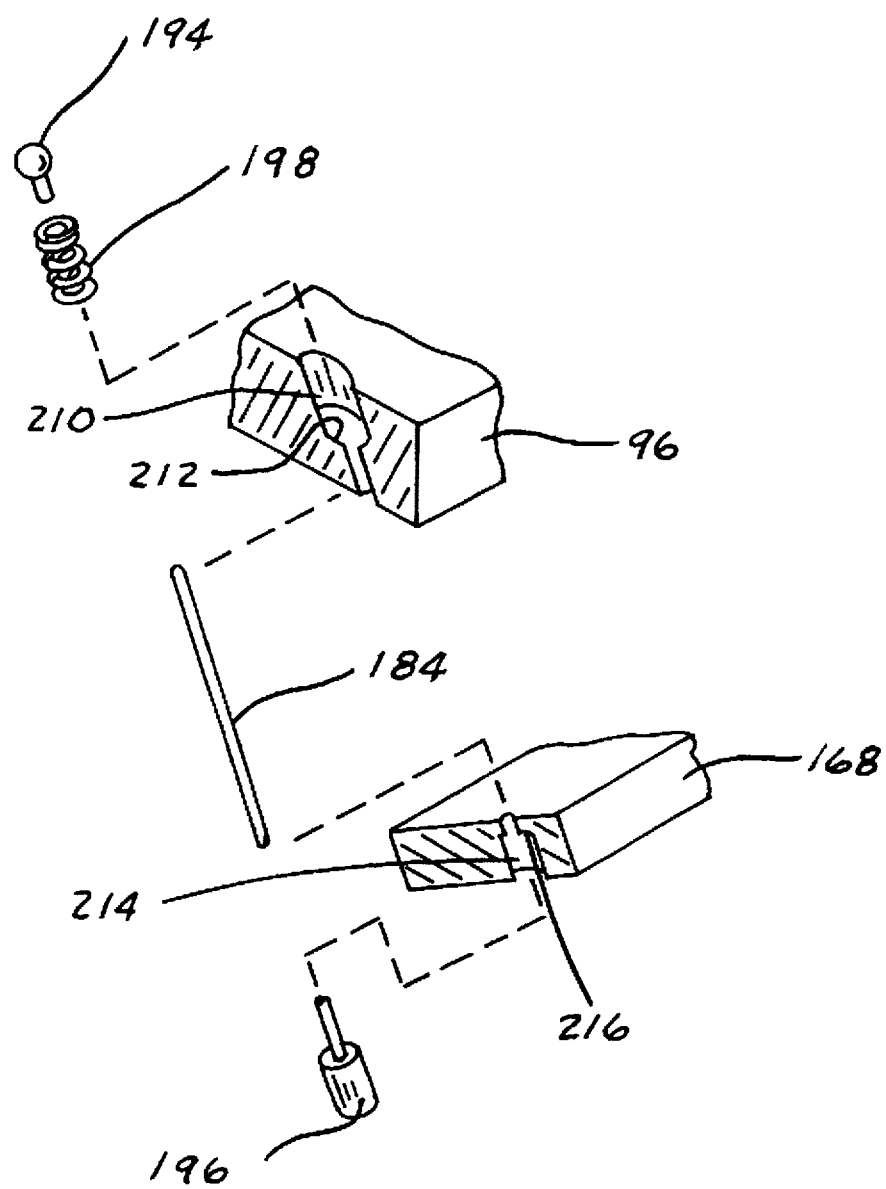
FIG. 3 is an enlarged perspective view of the sensing assembly of FIG. 2 with portions broken away showing a cable having a knob on each end of the cable, a portion of the frame positioned to lie above the cable and being formed to include a cable-receiving opening, a portion of a post positioned to lie beneath the cable and being formed to include a cable-receiving opening, and a cylindrical compression spring received by the cable and configured to hold the cable in tension when the cable is received by the cable-receiving openings of the frame and the post.

Each cable 186 is in tension and cables 186 are of substantially equal length so that frame 94 assumes a neutral or "zero" position when impact flowmeter 10 is inactive and impact plate 50 is not being deflected. The installation of cable 184 is representative of the installation of all cables 186 and is shown in greater detail in FIG. 3.

Cable 184 includes a first end having a first knob 194 and a second end having a second knob 196. A cylindrical compression spring 198 is received by cable 184 and is positioned to lie between first and second knobs 194, 196. Plate 96 of frame 94 is formed to include a first opening 210 having a stop 212, and post 168 is formed to include a second opening 214 having a stop 216. Cable 184 is received by first and second openings 210, 214 and spring 198 is positioned to engage first knob 194 and stop 212 of first opening 210. Second knob 196 of cable 184 engages stop 216. Spring 198 acts between first knob 194 and stop 212 to yieldably bias plate 96 toward second knob 196 and post 168.

Each cable 186 is installed between a post 162, 164, 166, 168 and plate 96 and is configured so that plate 96, and thus frame 94, are yieldably biased by equal forces toward opposing posts 162, 164, 166, 168, thereby suspending frame 94 between posts 162, 164, 166, 168 for movement in measurement direction 64 between secondary sensing element 48 and a secondary sensor 220. Sensor 220 is arranged to oppose frame 94 so that tip 130 of frame 94 engages sensor 220.

Sensor 220 is a transducer for providing output signal 70 in response to movements of secondary sensing element 48 which are communicated to sensor 220 by frame 94. Sensor 220 is preferably a CERABAR™ PMC 133 pressure transmitter produced by Endress+Hauser, Inc. of Greenwood, Ind., although satisfactory results can be achieved using other sensors such as pressure sensors, an LVDT in a proving ring, and a load cell. Preferably, the selected sensor is precalibrated for a predetermined load because frame 94 and cable suspension 156 provide very little resistance to deflection of frame 94 in measurement direction 64 so that nearly all deflections of impact surface 150 are transmitted directly to sensor 220.

A brace 226 is appended to base plate 18 and extends rearwardly therefrom as shown in FIG. 2. A mounting tab 228 is fixed to brace 226 and is formed to include a threaded opening 230. Sensor 220 is provided with an annular wall 232 that threadingly engages opening 230 so that sensor 220 is fixed relative to base plate 18.

Tip 130 of frame 94 engages sensor 220 adjacent to annular wall 232 as shown in FIGS. 2 and 5. As frame 94 moves, tip 130 acts against sensor 220. Sensor 220 detects the action of tip 130 and provides second output signal 70 in response to the action of tip 130.

A pre-tensioning assembly 224 is connected to brace 226 as shown in FIG. 2 and includes a mounting tab 234 fixed to brace 226 and formed to include a threaded opening 236. A threaded shaft 238 is threadingly received by opening 236. A knob 240 is fixed to rearward end of shaft 238. A compression spring 242 has a first end 244 engaging shaft 238 and a second end 248 engaging pre-tensioning pin 146 of back portion 100 of frame 94. Rotation of knob 240 in a clockwise first direction 250 compresses spring 240 to yieldably bias frame 94 toward secondary sensing element 52.

A downwardly-facing permanent moving magnet 256 is mounted on platform 148 as shown in FIG. 2. As shown in FIGS. 4 and 5, a magnet support 254 is fixed to base plate 18 and extends rearwardly therefrom beneath platform 148. An upwardly-facing permanent stationary magnet 258 is fixed to support 254 and is spaced-apart from moving magnet 256 by a predetermined amount so that magnets 256, 258 are magnetically coupled.

North pole 260 of moving magnet 256 is generally adjacent to south pole 262 of stationary magnet 258 and south pole 264 of moving magnet 256 is generally adjacent to north pole 266 of stationary magnet 258 when frame 94 is at the zero position. Magnets 256, 258 tend to move to a lowest energy position minimizing the distances between north pole 260 and south pole 262, and between south pole 264 and north pole 266, and magnets 256, 258 are positioned so that frame 94 is at the zero position when magnets 256, 258 are in the lowest energy position as shown in FIG. 5. Thus, magnets 256, 258 and cables 186 cooperate to yieldably bias frame 94 to the zero position when impact flowmeter 10 is inactive and impact plate 50 is not deflecting.

As described above, impact flowmeter 10 includes primary sensing mechanism 90 positioned to lie beneath secondary sensing mechanism 92 as shown best in FIGS. 4 and 5. There are some differences between primary and secondary sensing mechanisms 90, 92. For example, primary sensing mechanism 90 is coupled to impact plate 50 and secondary sensing mechanism 92 is coupled to secondary sensing element 52. In addition: primary sensing mechanism 90 is spaced-apart from base plate 18 by a distance 270 which is longer than the distance 272 by which secondary sensing mechanism 92 is spaced-apart from base plate 18 as shown in FIG. 5 to minimize the vertical size of sensor chamber 16 of housing 12; primary sensing mechanism 90 is oriented as a mirror image of secondary sensing mechanism 92 with respect to a plane b taken through magnet support 254 as shown in FIG. 4; and primary sensing element 48 includes stem 118' which is attached to socket 116' by two cotter pins 124', 125' as shown in FIG. 5. Two cotter pins 124', 125' are used to maintain the rigid connection between stem 118' and socket 116' as opposed to one cotter pin 124 used between stem 118 of secondary sensing element 52 and socket 116. Two cotter pins 124', 125' are preferred for connecting stem 118' and socket 116' to provide additional support since impact plate 50 engages the stream of solids 60. Use of cotter pins 124', 125' to rigidly attach primary sensing element 48 and resilient diaphragm 49 to L-shaped arm 98' allows for easy removal and replacement of primary sensing element 48 and diaphragm 49.

In operation, impact flowmeter 10 is installed into a process conduit to determine the mass flow rate of material through the conduit. Flange 78 is parallel to flange 80 to allow for easy mounting into existing equipment.

Prior to measuring the mass flow rate of stream of solids 60, impact flowmeter 10 is initialized by adjusting knobs 240, 240' of pre-tensioning assemblies 224, 224' to adjust the tension exerted by springs 242, 242' that bias frames 94, 94' toward sensing elements 48, 52. Next, knobs 138, 138' of L-shaped arms 98, 98' are rotated to adjust the lengths of posts 126, 126' and thus the initial force exerted by tips 130, 130' on sensor 218, 220 so that primary and secondary deflection sensing mechanisms 90, 92 are in the zero position and sensors 218, 220 are pre-loaded when impact flowmeter 10 is inactive and no stream 60 is flowing through impact flowmeter 10.

Pre-tensioning assembly 224 thus serves to pre-load sensor 220 and to assure that contact is maintained between sensor 220 and tip 130. In addition, pre-tensioning assembly 224 dampens minor vibrations of frame 94 relative to housing 12. If additional dampening is required, an air cylinder (not shown) can be used in addition to spring 242. When sensing mechanisms 90, 92 are in their respective zero positions, tips 130, 130' engage sensors 218, 220, and diaphragms 49, 53, are in relaxed, generally planar positions shown in FIG. 5.

Once impact flowmeter 10 is initialized, stream 60 of free flowing bulk solids is allowed to enter upper opening 36 of inlet chute 32. Most of the material flowing through inlet chute 32 moves along a bottom surface 33 of inlet chute 32 and strikes impact surface 150 adjacent stem 118' as shown in FIG. 1. A baffle plate 276 is attached to inlet chute 32 near upper opening 36 and is configured to direct stream 60 toward bottom surface 33 of chute 32. Impact surface 150 extends upwardly from stem 118' by a distance large enough to be impinged by all material in stream 60 passing through inlet chute 32.

Base plate 18 and diaphragms 49, 53 cooperate to isolate sensing assembly 56 from stream 60. In other words, sensing assembly 56 is located outside of flow chamber 14 of housing 12. Stems 118, 118' of primary and secondary sensing elements 48, 52 extend through diaphragms 49, 53 coupled to base plate 18 so that sensing assembly 56 is physically isolated from the process environment within flow chamber 14. Thus, sensing assembly 56 is protected from process temperature extremes, dust, and material build-up on sensing assembly 56 and sensors 218, 220.

Material striking impact surface 150 moves impact plate 50 and frame 94' in measurement direction 64' and thereafter falls downwardly through channel 154 formed in impact plate 50. Cable suspension 156 suspends frame 94' in housing 12 so that the effect of forces other than horizontal forces on sensor 218 is minimized. Therefore, any material build-up on impact surface 150 does not introduce measurement inaccuracies.

As stream 60 contacts impact surface 150, horizontal forces from stream 60 push impact plate 50 rearwardly in measurement direction 64'. Stem 118' of impact plate 50 is rigidly coupled to frame 94' so that the horizontal forces from stream 60 are transferred by stem 118' from impact surface 150 of impact plate 50 through diaphragm 49 to frame 94'. Frame 94' is suspended in sensor chamber 16 by cable suspension 156' for movement in measurement direction 64'. If the horizontal forces from stream 60 are sufficient to overcome the bias of pre-tensioning assembly 224' and the magnetic coupling of stationary magnet 258' and moving magnet 256', then frame 94' will deflect, communicating the deflection of impact plate 50 in measurement direction 64' to primary sensor 218 and primary sensor 218 will produce first output signal 68 in response to the deflection of impact plate 50 as communicated through frame 94'.

Housing 12 is supported by mounts 82 having vibration isolators 84, but some extraneous movement, unrelated to the impingement of stream 60 on impact surface 150 may nonetheless cause frame 94' to move in measurement direction 64', thereby adding "noise" unrelated to the mass flow rate of stream 60 to first output signal 68, reducing the clarity of first output signal 68. In addition, other undesired inputs such as, for example, temperature changes after initializing the system and pressure differentials between the inside of housing 12 and the outside of housing 12 can cause slight alterations of first output signal 68.

Secondary sensing element 52 is approximately the same mass as primary sensing element 48, and, as described above, the primary and secondary sensing mechanisms 90, 92 are substantially similar. Secondary sensing element 52 is positioned to lie away from stream 60 so that stream 60 does not impact secondary sensing element 52. As a result, the movement of secondary sensing element 52 and frame 94 of secondary sensing mechanism 92 in measurement direction 64 is generally due to the undesired inputs so that the undesired inputs detected by secondary sensing mechanism 92 are approximately the same as those detected by primary sensing element 90 and resulting in the noise in first output signal 68.

The undesired inputs act on secondary sensing element 52 and secondary sensing mechanism 92 to move frame 94, which is suspended in sensor chamber 16 by cable suspension 156 for movement in measurement direction 64. If the forces acting on secondary sensing mechanism 92 are sufficient to overcome the bias of pre-tensioning assembly 224 and the magnetic coupling of stationary magnet 258 and moving magnet 256, then frame 94 will deflect, communicating the deflection to secondary sensor 220, and secondary sensor 220 will produce second output signal 70 in response to the noise present in impact flowmeter 10.

Noise cancellation circuit 74 can be provided to reverse second output signal 70 and to combine the reversed second output signal 70 with first output signal 68 to produce third output signal 72. When second output signal 70 is reversed and superimposed on first output signal 68, the noise represented by second output signal 70 cancels the noise in first output signal 70 so that third output signal 72 is clearer and provides an even more accurate indication of the mass flow rate than first output signal 68. By canceling the noise through the use of third output signal 72, greater sensitivity is achieved and lower flow rates can be detected than might be detected by the manipulation of first output signal 68 alone. Combining first and second output signals 68, 70 to produce third output signal 72 compensates for uncontrolled variables and other undesired inputs that may unintentionally affect first output signal 68. For example, in various circumstances second output signal 70 may compensate for vibration, temperature changes, and pressure variations between the inside of housing 12 and the outside of housing 12.

Springs, flexures, pivots, and bearings all resist motion due to friction and, in some instances, resist motion due to the inherent stiffness of the device. This resistance to movement prevents the accurate measurement of extremely small forces that are unable to overcome this resistance to movement sufficiently to provide a distinct indication of the small forces. Cables 186 of cable suspension 156 provide very little resistance to motion, even when taut. Thus, the preferred embodiment of impact flowmeter 10 includes cables 186 to support moving frame 94 while minimizing the use of elements that resist motion. For example, the mechanism for zeroing and dampening impact flowmeter 10 of the present invention includes magnets fixed to frame 64 and support 254 and that are magnetically coupled without the use of a mechanism including a significant initial resistance to movement. Minimizing structure that resists motion allows for maximizing the accuracy while also maximizing the sensitivity of impact flowmeter 10 allowing for the measurement of very low mass flows.

As described above, velocity sensor 39 is mounted to inlet chute 32 as shown in FIG. 1 for providing a velocity output signal 284 in response to the velocity of the solids in stream of solids 60 as stream of solids 60 passes velocity sensor 39. Use of velocity output signal 284 can result in even greater accuracy of the mass flow rate measurement of impact flowmeter 10 as described below. Velocity sensor 39 is preferably a GRANUCOR™ DK-13 sensor for mean solids velocity measurement produced by Endress+Hauser, Inc. of Greenwood, Ind., although any sensor that can be configured to provide a velocity output that varies in response to the velocity of the solids in stream of solids 60 as stream of solids 60 passes velocity sensor 39 can be used without changing the scope of the invention as presently perceived.

Preferred velocity sensor 39 includes a velocity circuit 278 and first and second capacitance sensors 41, 43 mounted to the side wall of inlet chute 32 and configured so that the solids in stream of solids 60 pass by first capacitance sensor 41 before passing by second capacitance sensor 43 as shown in FIG. 1. Second capacitance sensor 43 is spaced apart from first capacitance sensor 41 a predetermined distance. A counter electrode 45 is mounted to the side wall of inlet chute 32 opposite first and second capacitance sensors 41, 43.

First capacitance sensor 41 provides a first capacitance signal 280 that varies as solids pass between counter electrode 45 and first capacitance sensor 43 to velocity circuit 278 of velocity sensor 39 as shown diagrammatically in FIG. 5. Second capacitance sensor 43 provides a second capacitance signal 282 that varies as solids pass between counter electrode 45 and second capacitance sensor 45 to velocity circuit 278. If the distribution of the solids in stream of solids 60 were to remain constant between the first and second capacitance sensors 41, 43, second capacitance signal 282 would be identical to first capacitance signal 280 except for a time lag between the two signals 280, 282, this time lag representing the travel time of the solids across the predetermined distance between the first and second capacitance sensors 41, 43. Although first and second capacitance signals 280, 282 may vary slightly due, for example, to changes of the orientation of solids in the stream of solids 60 between first and second capacitance sensors 41, 43, velocity circuit 278 can still correlate signals 280, 282 to determine the travel time. Velocity circuit 278 provides velocity output 284 in response to the predetermined distance between first and second capacitance sensors 41, 43 and the travel time computed by velocity circuit 278 using signals 280, 282, so that velocity output 284 is provided in response to the velocity of the solids in stream of solids 60 as the solids pass between first and second capacitance sensors 41, 43.

Many conventional impact flowmeters operate using a "velocity assumption" that the velocity of the solids impinging upon an impact plate is constant. This assumption introduces error into the flow measurement output provided by the conventional impact flowmeters, and this error reduces the accuracy of the flow measurement output. For example, high humidity may cause solids in stream of solids 60 to clump together, thereby reducing the velocity of those solids through the impact flowmeter. Conventional impact flowmeters are generally unable to compensate for this velocity change which in the case of clumped-together solids may cause a false indication of lower material flow.

Impact flowmeter 10 in accordance with the present invention includes flowmeter output circuit 288 that combines velocity output signal 284 with third output signal 72 and provides a flowmeter output signal 286 in response to velocity output signal 284 and third output signal 72. Flowmeter output signal 286 varies in response to the mass flow rate of solids through impact flowmeter 10 and provides a more accurate indication of the mass flow rate of the solids in stream of solids 60 than is typically provided by conventional impact flowmeters.

Although the invention has been described in detail with reference to a certain preferred embodiment, variations and modifications exist within the scope and spirit of the invention as described and defined in the following claims.

I claim:

1. An impact flowmeter for measuring the flow rate of solids flowing in a stream of flowing solids, the impact flowmeter comprising a housing having an inlet, an outlet, and an interior region therebetween, the housing being positioned so that the stream flows into the inlet and out through the outlet, an impact sensing assembly received by the interior region of the housing and including an impact plate engaging the solids and configured to move relative to the housing in a measurement direction in response to the impingement of the solids on the impact plate, transducer means fixed relative to the housing for providing an output signal in response to the movement of the impact plate, and a frame having a first end engaging the impact plate and a second end engaging the transducer means so that the frame communicates the movement of the impact plate to the transducer means, and a cable suspension including a plurality of cables coupling the housing to the frame, the cable suspension suspending the frame between the impact plate and the transducer means for movement of the frame.

2. The impact flowmeter of claim 1, wherein the measurement direction is perpendicular to a plane and the cable suspension includes a cable coupled to the frame and coupled to the housing, the cable being substantially parallel to the plane.

3. The impact flowmeter of claim 2, wherein the cable and the plane cooperate to define an angle between −5 and 5 degrees.

4. The impact flowmeter of claim 1, wherein the measurement direction is perpendicular to a plane and the cable suspension includes a first cable and a second cable, each of the first and second cables having a first end coupled to the frame and a second end coupled to the housing, the first cable cooperating with the plane to define an angle between −5 and 5 degrees and the second cable cooperating with the plane to define an angle between −5 and 5 degrees so that the first and second cables permit movement of the frame in a direction perpendicular to the plane.

5. The impact flowmeter of claim 4, wherein the first and second cables cooperate to define an angle between 30 and 40 degrees relative to a vertical plane that is parallel to the measurement direction.

6. The impact flowmeter of claim 4, wherein the first and second cable cooperate to define an angle between 130 and 160 degrees.

7. The impact flowmeter of claim 4, wherein the first and second cables cooperate to define a V-shaped cable suspension to restrict movement of the frame in directions other than the measurement direction.

8. The impact flowmeter of claim 1, wherein the housing includes a base plate positioned to lie in front of the deflection sensing assembly and a plurality of posts attached to the base plate and extending rearwardly therefrom, the posts defining a cage surrounding the frame, the cable suspension being coupled to the cage and coupled to the frame.

9. The impact flowmeter of claim 8, wherein the cable suspension includes a plurality of cables, each cable having a first end coupled to one of the posts and a second end coupled to the frame, each post being coupled to two cables.

10. The impact flowmeter of claim 1, wherein the housing further includes a base plate formed to include an opening, the impact plate being positioned to lie in front of the base plate and including a rearwardly extending stem that extends through the opening, the frame being positioned to lie behind the base plate and being coupled to the stem.

11. The impact flowmeter of claim 10, wherein the housing further includes a plurality of posts connected to the base plate and extending rearwardly therefrom, a first post and a second post being positioned to lie above the frame and a third post and a fourth post being positioned to lie beneath the frame, the cable suspension being coupled to the first, second, third, and fourth posts and coupled to the frame.

12. The impact flowmeter of claim 11, wherein the cable suspension includes a first cable coupling the first post to the frame, a second cable coupling the second post to the frame, a third cable coupling the third post to the frame, and a fourth cable coupling the fourth post to the frame, the measurement direction is substantially perpendicular to a first plane, and the first, second, third, and fourth cables are substantially parallel to the first plane, and are configured to restrict movement of the frame in directions other than the measurement direction.

13. The impact flowmeter of claim 1, wherein the frame is magnetically coupled to the housing.

14. The impact flowmeter of claim 13, further comprising a permanent first magnet fixed relative to the frame and a permanent second magnet fixed relative to the housing, the first and second magnets being in magnetic communication to resist movement of the first magnet relative to the second magnet.

15. The impact flowmeter of claim 14, further comprising a second deflection sensing assembly coupled to the housing and including a second transducer means, a secondary sensing element, and a second frame having a first end engaging the secondary sensing element and a second end coupled to the second transducer means so that the second frame communicates deflections of the secondary sensing element to the second transducer means, a third permanent magnet fixed relative to the second frame and a fourth permanent magnet fixed relative to the housing, the third and fourth permanent magnets being in magnetic communication to resist movement of the third magnet relative to the fourth magnet.

16. The impact flowmeter of claim 1, further comprising dampening means for resisting movement of the frame relative to the housing.

17. The impact flowmeter of claim 16, wherein the dampening means includes a spring having a first end coupled to the frame and a second end coupled to the housing to yieldably bias the frame toward the impact plate.

18. The impact flowmeter of claim 16, wherein the dampening means includes an air cylinder acting between the frame and the housing to yieldably bias the frame toward the impact plate.

19. The impact flowmeter of claim 1, further comprising a velocity sensor supported in fixed relation to the housing and configured to provide a velocity output signal in response to the velocity of solids in the stream of flowing solids.

20. The impact flowmeter of claim 19, wherein the velocity output signal is in response to the velocity of solids in the stream of flowing solids between the inlet and the impact plate.

21. The impact flowmeter of claim 19, further comprising a flowmeter output circuit that provides a flowmeter output that varies with the mass flow rate of solids in the stream of flowing solids in response to the output signal from the transducer and the velocity output signal.

22. The impact flowmeter of claim 19, wherein the velocity sensor includes a first capacitance sensor.

23. The impact flowmeter of claim 22, wherein the velocity sensor further includes a second capacitance sensor spaced apart from the first capacitance sensor a predetermined distance and the velocity is computed as the predetermined distance divided by the time that solids travel between the first and second capacitance sensors.

24. An impact flowmeter for measuring the flow rate of solids in a stream of flowing solids, the impact flowmeter comprising a housing having an inlet and an outlet, the housing being positioned so that solids flow into the inlet and out through the outlet, an impact sensing assembly coupled to the housing and including an impact plate engaging the solids and configured to move relative to the housing in a measurement direction in response to the impingement of solids on the impact plate, transducer means fixed relative to the housing for providing an output signal in response to the movement of the impact plate, and a frame having a first end engaging the impact plate and a second end engaging the transducer means, and cable means for supporting the frame between the impact plate and the transducer means so that the frame communicates the movement of the impact plate to the transducer means, the cable means being coupled to the housing and to the frame.

25. The impact flowmeter of claim 24, further comprising zero means coupled to the frame for urging the frame toward a zero position in which the frame engages the transducer means and is yieldably biased toward the impact plate.

26. The impact flowmeter of claim 25, wherein the zero means includes a first permanent magnet fixed to the frame, a second permanent magnet fixed to the housing, the first and second magnets being magnetically coupled.

27. The impact flowmeter of claim 24, wherein the cable means includes means coupled to the frame and to the housing for restricting movement of the frame relative to the housing in directions other than the measurement direction.

28. The impact flowmeter of claim 27, further comprising zero means coupled to the frame for urging the frame toward a zero position in which the frame engages the transducer means and is yieldably biased toward the impact plate.

29. The impact flowmeter of claim 28, wherein the zero means includes dampening means coupled to the frame for resisting movement of the frame relative to the transducer means.

30. The impact flowmeter of claim 24, wherein the housing further includes a plurality of posts fixed to the base plate and extending rearwardly therefrom, a first post and a second post being positioned to lie above the frame and a third post and a fourth post being positioned to lie beneath the frame, the cable means being coupled to the first, second, third, and fourth posts and coupled to the frame.

31. The impact flowmeter of claim 30, wherein the cable means includes a first cable coupling the first post to the frame, a second cable coupling the second post to the frame, a third cable coupling the third post to the frame, and a fourth cable coupling the fourth post to the frame, the measurement direction is substantially perpendicular to a first plane, and the first, second, third, and fourth cables are substantially parallel to the first plane, and the first, second, third, and fourth cables are configured to restrict movement of the frame in directions other than the measurement direction.

32. The impact flowmeter of claim 24, further comprising means coupled to the housing for providing a second output signal in response to movement of the housing and cancellation means for providing a third output signal in response to the first and second output signals.

33. The impact flowmeter of claim 32, wherein the cancellation means includes means for reversing the second output signal to provide a reversed second output signal and means for superimposing the reversed second output signal on the first output signal to produce the third output signal.

34. The impact flowmeter of claim 24, further comprising dampening means coupled to the frame for resisting movement of the frame relative to the transducer means.

35. The impact flowmeter of claim 34, wherein the dampening means includes a magnet fixed relative to the frame.

36. The impact flowmeter of claim 34, wherein the dampening means includes a spring coupled to the frame to yieldably bias the frame toward the impact plate.

37. The impact flowmeter of claim 34, wherein the dampening means includes an air cylinder acting between the frame and the housing.

38. An impact flowmeter for measuring the flow of solids, the impact flowmeter comprising a housing having an inlet and an outlet, the housing being positioned so that solids flow into the inlet and out through the outlet, and an impact sensing assembly coupled to the housing and including an impact plate engaging solids and configured to move in response to the impingement of solids on the impact plate, transducer means fixed relative to the housing for providing an output signal in response to the movement of the impact plate, and a frame having a first end engaging the impact plate and a second end engaging the transducer means so that the frame communicates the movement of the impact plate to the transducer means, the frame and the housing being magnetically coupled to yieldably bias the frame toward an initial position relative to the housing.

39. The impact flowmeter of claim 38, further comprising a first magnet having a north pole and a south pole, the first magnet being fixed to the frame, and a second magnet having a north pole and a south pole, the second magnet being fixed relative to the housing and being spaced apart from the first magnet with the north pole of the second magnet being adjacent to the south pole of the first magnet and the south pole of the second magnet being adjacent to the north pole of the first magnet, the first and second magnets being magnetically coupled so that the first and second magnets cooperate to resist movement of the first magnet relative to the second magnet.

40. The impact flowmeter of claim 39, wherein the housing includes a base plate and a magnet support fixed to the base plate and extending inwardly from the base plate generally toward the transducer means, the second magnet being fixed to the magnet support.

41. The impact flowmeter of claim 40, wherein the frame further includes a generally vertically extending elongated back portion having a first end and a second end, the back portion engaging the transducer means at an engagement point spaced-apart from both of the first end and the second end, and the first magnet being connected to the first end.

42. The impact flowmeter of claim 38, further comprising a second transducer means fixed relative to the housing for providing a second output signal in response to undesired inputs such as uncontrolled movement of the housing so that the second output signal is generally the equivalent of a noise portion of the output signal of the transducer means.

43. The impact flowmeter of claim 42, further comprising a second frame engaging the second transducer means, the second frame and the housing being magnetically coupled so that the second frame tends to both move to an initial position relative to the housing and to resist movement of the second frame away from the initial position of the second frame.

44. The impact flowmeter of claim 43, further comprising first, second, third, and fourth magnets, the first magnet being fixed to the first frame, the second magnet being fixed relative to the housing and spaced apart from the first magnet, the first and second magnets being magnetically coupled so that the first and second magnets cooperate to resist movement of the first magnet relative to the second magnet, the third magnet being fixed to the second frame, and the fourth magnet being fixed relative to the housing and spaced apart from the third magnet, the third and fourth magnets being magnetically coupled so that the third and fourth magnets cooperate to resist movement of the third magnet relative to the fourth magnet.

45. An impact flowmeter for measuring the mass flow rate of a flow stream of solids, the impact flowmeter comprising a housing, a primary sensor fixed to the housing and configured to provide a first signal in response to the mass flow rate of the flow stream of solids, a secondary sensor fixed to the housing and configured to provide a second signal in response to undesired movement of the housing, and means coupled to the primary sensor and the secondary sensor for providing a third signal in response to the first and second signals.

46. The impact flowmeter of claim 45, further comprising primary sensing element having an impact surface engaging the flow stream of solids, a first frame having a first end engaging the primary sensing element and a second end engaging the primary sensor, a secondary sensing element, and a second frame having a first end engaging the secondary sensing element and a second end engaging the secondary sensor so that the first and second frames communicate the positions of the primary and secondary sensing elements respectively to the respective primary and secondary sensors.

47. The impact flowmeter of claim 46, wherein the secondary sensing element is positioned to lie above the flow stream of solids and above the impact surface.

48. The impact flowmeter of claim 47, wherein the housing further includes a base plate having a first opening and a second opening, the base plate being positioned to lie in front of the deflection sensing assembly and behind the impact surface and the secondary sensing element, the impact surface being formed on an impact plate having a back surface opposite the impact surface and a rod connected to the back surface and extending rearwardly therefrom, the rod extending through the first opening and being connected to the first frame, the secondary sensing element including a rod extending rearwardly therefrom, the rod of the secondary sensing element extending through the second opening and being connected to the second frame.

49. The impact flowmeter of claim 45, further comprising a flowmeter output circuit for providing a flowmeter output signal that varies with the mass flowrate of the flow stream of solids in response to the third signal and in response to the velocity of the stream of solids.

50. The impact flowmeter of claim 49, further comprising a velocity sensor for providing a velocity output signal in response to the velocity of the stream of solids, the flowmeter output circuit providing the flowmeter output signal in response to the third signal and in response to the velocity output signal.

51. The impact flowmeter of claim 45, wherein the velocity sensor includes a counter electrode carried by the chute and a capacitance sensor carried by the chute and opposing the counter electrode, the capacitance sensor providing a first capacitance output signal that varies in response to changes in capacitance between the counter electrode and the capacitance sensor.

52. The impact flowmeter of claim 45, wherein the velocity sensor further includes a second capacitance sensor spaced apart from the first capacitance sensor a predetermined distance and opposing the counter electrode, the second capacitance sensor providing a second capacitance output signal that varies in response to changes in capacitance between the counter electrode and the second capacitance sensor, the velocity sensor providing the velocity output in response to the first and second capacitance output signals.

* * * * *